T. H. JACOB.
MEANS FOR CONNECTING THE CONTROLLING AND DRIVING MECHANISMS OF A SERIES OF AUTOMOBILES.
APPLICATION FILED JUNE 8, 1917.
1,288,600.
Patented Dec. 24, 1918.
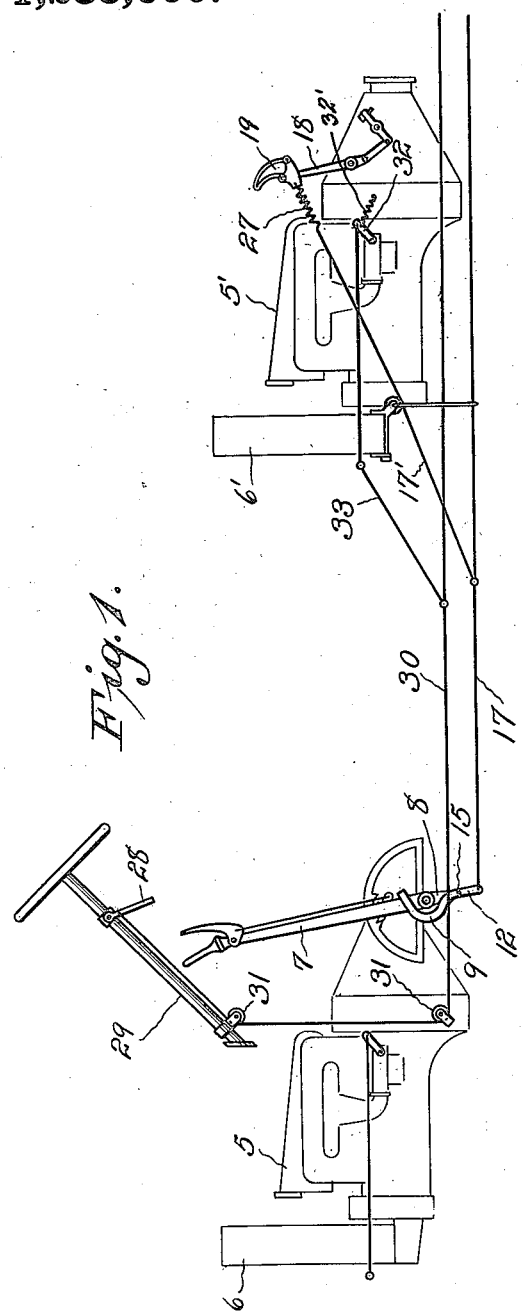
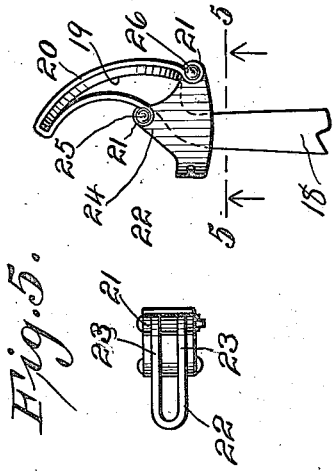
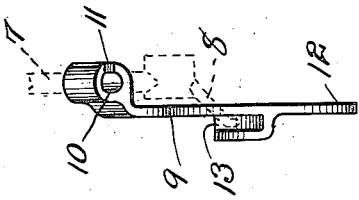
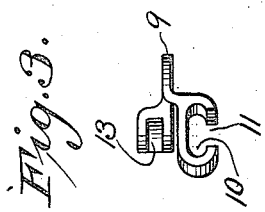
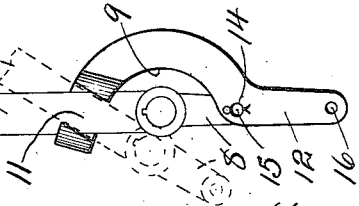

UNITED STATES PATENT OFFICE.

THOMAS H. JACOB, OF WAUSAU, WISCONSIN.

MEANS FOR CONNECTING THE CONTROLLING AND DRIVING MECHANISMS OF A SERIES OF AUTOMOBILES.

1,288,600.　　　　　Specification of Letters Patent.　　Patented Dec. 24, 1918.

Application filed June 8, 1917.　Serial No. 173,500.

*To all whom it may concern:*

Be it known that I, THOMAS H. JACOB, a citizen of the United States, and resident of Wausau, in the county of Marathon and State of Wisconsin, have invented certain new and useful Improvements in Means for Connecting the Controlling and Driving Mechanisms of a Series of Automobiles; and I do hereby declare that the following is a full, clear, and exact description thereof.

My invention refers to certain new, useful and practical means for connecting the controlling and driving mechanisms of a series of automobiles coupled in following order, whereby to procure the operation thereof as a single unit; and is especially adapted to be used in connection with the automobile coupling device illustrated in an application filed by me June 8, 1917, Serial No. 173,499.

One of the many objects of my invention consists in the novel method I employ for connecting the speed control means of a series of automobiles coupled in following order so that the same may be readily driven as a single unit by a driver seated in the foremost car.

A further object of this invention is to provide novel means operated from the steering column of the foremost machine for controlling the speed of the motors of the following cars so as to equally distribute the pulling power of each coupled automobile.

Another object of my invention is to provide an extension adapted to be attached to the hand brake lever of the foremost car for increasing the leverage thereof and having connections leading from the extension to the clutch pedals of the succeeding cars whereby to procure simultaneous changing of gears of the machines.

A still further object resides in providing a novel attachment for the clutch pedals of the following cars to receive connections leading from the extension on the hand brake lever of the foremost car.

With the above and other objects in view which will appear as the description proceeds, my invention resides in the novel construction, combination and arrangement of parts substantially as hereinafter described and particularly defined by the appended claims, it being understood that such changes in the precise embodiment of the invention herein disclosed may be made as come within the scope of the claims.

In the accompanying drawings I have illustrated one complete example of the physical embodiment of my invention constructed according to the best mode I have so far devised for the practical application of the principles of my invention, in which:

Figure 1 is a diagrammatic view illustrating several machines coupled in accordance with my invention.

Fig. 2 is a side elevational view of the extension I employ attached to the hand brake lever of the foremost machine, the lower end of said lever being shown in conventional outline as secured in the extension, and in dotted lines as being inserted in the guide opening of the extension.

Fig. 3 is a top plan view of this extension detached from the hand brake lever.

Fig. 4 is a front elevational view of this extension illustrating the hand brake lever in dotted lines as secured therein.

Fig. 5 is a plan view of the adjustment secured to the clutch pedal of the machines, said view being taken on the line 5—5 of Fig. 6, and Fig. 6 is a side elevational view of this adjustment illustrating the same as secured upon the foot engaging portion of the pedal.

This invention, while being especially adapted for use in coupling Ford cars, may be employed in the coupling of any make machine with which the same will operate efficiently, but for the purpose of illustration I will describe my invention as being attached to a series of Ford cars coupled in following order.

Referring now more particularly to the drawings, in which 5, 5′ and 6 and 6′ represent the motor and radiator respectively of a series of cars coupled by suitable means (not shown) for insuring the simultaneous steering of each car, and the transmissions or change speed operating means thereof are connected together as hereinafter described.

The hand brake lever assembly 7 of the foremost car has its lower arm 8 disconnected from the usual emergency brake (not shown) and detachably mounted thereon is an extension member comprising a yoke portion 9 curved or offset so as to pass around the pivot of the lever and has formed in its upper end a lever receiving guide 10 having an inclined opening 11 therein of a size just sufficient to admit insertion there-through of lever 7. The lower end of the extension is formed with a downwardly extending arm 12 adapted to form a continuation of the lever 7 below its pivot and has formed in one side thereof near the yoke 9 an offset pocket 13 for receiving the lower arm 8 of the lever 7 and has therein openings 14 for receiving a pin 15 securing said arm 8 in the pocket, and in the lowermost end of arm 12 is an opening 16 for receiving a suitable connection 17 leading to the following cars as will be later described.

The clutch pedals 18 of the following cars have secured upon their foot engaging portion 19 an attachment adapted to receive a connection 17' leading from connection 17 whereby to insure the simultaneous manipulation of said pedal upon movement of the lever 7. This attachment comprises a foot engaging portion 20 bent to conform to the portion 19 of the pedal and having its ends 21 bifurcated to receive the locking member 22 each having arms 23 engaging the shank of the pedal and formed with the ears 24 pivoted at 25 to one end of the member 20 and detachably secured at 26 to the other end of member 20, a spiral spring 27 connecting the connection 17' with the member 22 as clearly disclosed in Fig. 1.

This pedal 18 is known to the trade as the clutch pedal of a Ford car which controls the first or low speed of the machine when pressed forwardly, and controls the high speed when allowed to extend rearwardly its entire limit of movement. The hand brake lever 7 controls the emergency brake and also serves to prevent the return of pedal 18 to high speed when the same is in the position shown in Fig. 1, but as will be readily understood by those skilled in the art to which an invention of this character appertains, the hand brake levers (not shown) of the following machines are always extended forwardly in order to permit return of the pedal 18 to high speed.

Thus it will be seen that in starting a series of machines, the lever 7 of the foremost machine is drawn rearward of the position shown in Fig. 1 and at the same time the driver depresses the clutch pedal (not shown) of the foremost machine which will cause the simultaneous advancement of the cars in what is generally termed first or low speed, and when the machines have sufficient momentum, the driver releases the clutch pedal of the foremost machine and at the same time advances the lever 7 to its foremost position permitting all of the pedals 18 to spring back into high speed.

For permitting the unitary regulation of the speed of all the motors, an operating lever 28 is pivoted to the steering column 29 of the foremost machine and has connected therewith an operating cord 30 passing around guide pulleys 31 and leading from the cord 30 to the throttle 32 of each motor is a connection 33, the throttle 32 being normally urged to closed position by means of a spring 32'; and as will be obvious the manipulation of lever 28 will serve to control the speed of the motors and at the same time permit the driver to choke the motors of the following cars when coasting down a hill.

While I have not illustrated any means for advancing or controlling the spark of the motors, it will be appreciated that a connection similar to that used for controlling the carbureter throttle may be employed.

From the foregoing description taken in connection with the accompanying drawings, it will be appreciated that by my invention two or more automobiles may be coupled so that they may be controlled as a single unit by the driver of the foremost machine, and while it is especially adapted for use in connection with the steering control means illustrated in my aforementioned application, any desired means may be used for coupling the steering gear of the series of machines.

What is claimed is:

1. The combination with a series of machines coupled in following order, of an extension secured to a hand lever of the foremost machine, and a connection leading from said extension to the clutch pedal of the succeeding machines.

2. The combination with a series of machines coupled in following order, of an extension secured to the hand brake lever of the foremost car, an attachment secured to the clutch pedals of the succeeding machines, and connections between the extension of the hand lever of the first machine and the attachment on the clutch pedals of the succeeding machines whereby to control the driving of the machines as a single unit.

3. The combination with a series of machines coupled in following order, of an extension secured to the hand brake lever of the foremost machine, an attachment secured to the clutch pedals of the succeeding machines, a resilient connection between the extension on the hand brake lever of the foremost machine and the attachments on the clutch pedals of the succeeding machines whereby to control the driving of the machines as a single unit.

4. The combination with a series of machines coupled in following order, of an extension secured to the hand brake lever of the foremost machine, an attachment secured to the clutch pedals of the succeeding machines, connections between the extension on the hand brake lever of the foremost machine and the attachments on the clutch pedals of the succeeding machines, and means operated from the foremost machine for controlling the motors thereof as a single unit.

5. The combination with a series of machines coupled in following order, of an extension secured to the hand brake lever of the foremost machine, an attachment secured to the clutch pedals of the succeeding machines, connections between the extension on the hand brake lever of the foremost machine and the attachment on the clutch pedals of the succeeding machines, and means operated from the steering column of the foremost machine for controlling the motors of the machines whereby to procure the operation thereof as a single unit.

6. The combination with a hand brake lever of a machine, of an extension adapted to be attached to the lower part thereof comprising a one piece member having a yoke portion, a lever receiving guide in the outer end thereof engaging said lever above its pivot, a downwardly extending arm adapted to form a continuation of the lever below its pivot and means formed on said arm for detachably receiving an arm formed on the lever below its pivot.

7. The combination with a pedal having a foot engaging portion of an attachment adapted for removable securement thereto comprising a clamp member bent to conform with the shape of the foot engaging portion of the pedal, locking members pivoted to one end of said clamp member and engaging the shank of said pedal, and means securing the locking members to the other end of the clamp member whereby to removably retain the attachment upon the pedal.

In testimony that I claim the foregoing I have hereunto set my hand at Wausau, in the county of Marathon and State of Wisconsin.

THOMAS H. JACOB.